United States Patent
Hirota

(10) Patent No.: US 9,162,268 B2
(45) Date of Patent: *Oct. 20, 2015

(54) ELECTRIC-RESISTANCE-WELDED PIPE WELDING APPARATUS

(75) Inventor: Yoshiaki Hirota, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 378 days.

This patent is subject to a terminal disclaimer.

(21) Appl. No.: 13/395,788

(22) PCT Filed: Sep. 15, 2010

(86) PCT No.: PCT/JP2010/065933
§ 371 (c)(1),
(2), (4) Date: Mar. 13, 2012

(87) PCT Pub. No.: WO2011/034087
PCT Pub. Date: Mar. 24, 2011

(65) Prior Publication Data
US 2012/0175351 A1    Jul. 12, 2012

(30) Foreign Application Priority Data

Sep. 16, 2009  (JP) ................................ 2009-214886

(51) Int. Cl.
*B23K 9/00* (2006.01)
*B23K 31/02* (2006.01)
(Continued)

(52) U.S. Cl.
CPC ............... *B21C 37/08* (2013.01); *B23K 13/025* (2013.01); *B23K 2201/06* (2013.01)

(58) Field of Classification Search
CPC ............. B23K 13/0873; B23K 13/046; B23K 11/062; B23K 11/063; B23K 11/06; B23K 13/00; B23K 13/02; B23K 13/023

USPC .............. 219/61.7, 61.2, 61.3, 59.1, 61.1, 67, 219/78.16, 82, 61.11
See application file for complete search history.

(56) References Cited

U.S. PATENT DOCUMENTS 2,818,489 A   12/1957   Kalning et al.
2,857,503 A   10/1958   Rudd et al.
(Continued)

FOREIGN PATENT DOCUMENTS

CN   201189526 Y   2/2009
JP   46-6339 B1    2/1971
(Continued)

OTHER PUBLICATIONS

Russian Notice of Allowance for Russian Application No. 2012109538 mailed Aug. 12, 2013 with English translation.
(Continued)

*Primary Examiner* — Tu B Hoang
*Assistant Examiner* — Alba Rosario-Aponte
(74) *Attorney, Agent, or Firm* — Birch, Stewart, Kolasch & Birch, LLP

(57) ABSTRACT

An electric-resistance-welded pipe welding apparatus includes: an impeder that is disposed in the inner portion of a metal strip which is bent into the cylindrical shape, and is disposed spanning over from the upstream to the downstream of a position in which the induction coil is present when viewed along a traveling direction of the metal strip; and a metallic shield plate that is disposed further upstream than an upstream end of the impeder and is disposed in a position which is further downstream than the rolls when viewed along the traveling direction, the metallic shield plate including a hole portion through which the metal strip bent into the cylindrical shape passes, and the metallic shield plate shielding a magnetic flux generated in the induction coil.

4 Claims, 4 Drawing Sheets

(51) Int. Cl.
*B21C 37/08* (2006.01)
*B23K 13/02* (2006.01)

(56) References Cited

U.S. PATENT DOCUMENTS

| | | | |
|---|---|---|---|
| 2,938,993 A | | 5/1960 | Rudd |
| 3,122,624 A | | 2/1964 | Domizi |
| 3,234,353 A | * | 2/1966 | Inoue ............................. 219/82 |
| 3,270,176 A | * | 8/1966 | O'Neill et al. ................ 219/613 |
| 3,355,567 A | * | 11/1967 | Worden et al. ................ 219/612 |
| 3,441,704 A | | 4/1969 | Worden et al. |
| 3,511,957 A | | 5/1970 | Cannon et al. |
| 3,648,005 A | * | 3/1972 | Rudd ............................ 219/613 |
| 3,763,342 A | | 10/1973 | Oppenheimer |
| 4,197,441 A | | 4/1980 | Rudd |
| 4,246,464 A | | 1/1981 | Altstetter et al. |
| 4,268,736 A | * | 5/1981 | Cuvelier ....................... 219/613 |
| 4,694,134 A | | 9/1987 | Ross |
| 5,571,437 A | | 11/1996 | Rudd |
| 5,915,421 A | | 6/1999 | Borzym et al. |
| 2008/0308550 A1 | | 12/2008 | Nemkov |
| 2012/0325805 A1 | * | 12/2012 | Hasegawa et al. ............ 219/608 |

FOREIGN PATENT DOCUMENTS

| | | |
|---|---|---|
| JP | 53-44449 A | 4/1978 |
| JP | 54-8539 B2 | 4/1979 |
| JP | 56-39115 A | 4/1981 |
| JP | 59-206180 A | 11/1984 |
| JP | 63-97373 A | 4/1988 |
| JP | 63-220977 A | 9/1988 |
| JP | 1-178380 A | 7/1989 |
| JP | 4-23892 U | 2/1992 |
| JP | 5-228650 A | 9/1993 |
| JP | 5-261564 A | 10/1993 |
| JP | 11-254027 A | 9/1999 |
| JP | 2000-52059 A | 2/2000 |
| JP | 2001-47252 A | 2/2001 |
| JP | 2002-273576 A | 9/2002 |
| JP | 2004-114101 A | 4/2004 |
| SU | 599940 A | 3/1978 |

OTHER PUBLICATIONS

Chinese Notice of Allowance and Search Report, dated Dec. 5, 2013, for Chinese Application No. 201080040803.X, including English translation thereof.
"Fundamentals and Applications of High Frequency", Tokyo Denki University Press, pp. 79 and 80.
PCT/ISA/210—International Search Report dated Dec. 14, 2010, issued in PCT/JP2010/065933.
Chinese Office Action and Search Report, dated Jan. 22, 2014, for Chinese Application No. 201080040860.8, with English translation of the Search Report.
International Preliminary Report on Patentability and English translation of the Written Opinion of the International Searching Authority, dated Apr. 11, 2012, for International Application No. PCT/JP2010/065933 (Forms PCT/IB/373 and PCT/ISA/237).
International Preliminary Report on Patentability and English translation of the Written Opinion of the International Searching Authority, dated Apr. 11, 2012, for International Application No. PCT/JP2010/066014 (Forms PCT/IB/373 and PCT/ISA/237).
International Search Report, dated Oct. 12, 2010, for International Application No. PCT/JP2010/066014, including an English translation.
Japanese Notice of Allowance, dated Feb. 26, 2013, for Japanese Application No. 2011-206076, including English translation.
Russian Decision on Grant, mailed Aug. 12, 2013, for Russian Application No. 2012110053, including an English translation.
US Office Action, dated May 22, 2014, for U.S. Appl. No. 13/395,728.
U.S. Office Action dated Dec. 18, 2014, issued in U.S. Appl. No. 13/395,728.
US Office Action, dated Jul. 30, 2015, issued in U.S. Appl. No. 13/395,728.

* cited by examiner

PRIOR ART

ELECTRIC-RESISTANCE-WELDED PIPE WELDING APPARATUS

TECHNICAL FIELD

The present invention relates to an electric-resistance-welded pipe welding apparatus which joins both ends of a metal strip, which is bent into a cylindrical shape, through induction heating and manufactures the electric-resistance-welded pipe. More particularly, the present invention relates to an electric-resistance-welded pipe welding apparatus. The welding apparatus is capable of preventing rolls or the like installed therein from being damaged by eliminating current which flows upstream of an induction coil that supplies power, and capable of efficiently welding by decreasing reactive power. Priority is claimed on Japanese Patent Application No. 2009-214886, filed Sep. 16, 2009, the content of which is incorporated herein by reference.

BACKGROUND ART

As methods for manufacturing a metal pipe, there is a method of manufacturing a seamless pipe by directly making hole into a metal billet, or a method of manufacturing a pipe by extruding a metal, in addition to a method of manufacturing an electric-resistance-welded pipe, a spiral pipe, or the like, in which a metal strip is bent and welded into a pipe shape.

Because of the particularly high productivity and the low cost, electric-resistance-welded pipes have been produced in large quantities. Such electric-resistance-welded pipes are molded into a cylindrical shape while the metal strip is travelling, and finally, high frequency current flow is applied to both ends of the metal plate to be joined, so that the temperature of both ends are increased to the melting temperature, and the both end surfaces are press-welded by rolls, resulting in a pipe shape. At this time, as methods for supplying current to both ends of the metal strip, there is a method in which an induction coil is wound so as to surround the outside of the metal strip and the induction current is directly generated in the metal strip by making a primary current flow through the induction coil. As another method, there is a method in which metallic electrodes referred to as a "contact tip" are pushed against the ends of the metal strip and the current flows directly from a power source to the metal strip. At this time, in many cases, as the current which flows through the induction coil or the electrodes, high frequency current having a frequency of about 100 to 400 kHz is generally used and a ferromagnetic body referred to as an "impeder" is disposed on or above the inner surface of the pipe.

CITATION LIST

Non Patent Documents

[Non-Patent Document 1] "Fundamentals and Applications of High Frequency" (Pages 79 and 80, Tokyo Denki University Press)

SUMMARY OF THE INVENTION

Problems to be solved

FIG. 1 is a schematic plan view for explaining a welding of an electric-resistance-welded pipe using a method which generates induction current by using an induction coil. FIG. 2 is a longitudinal cross-sectional view thereof. A metal strip 1 which is a material to be welded, while being conveyed, is processed by rolls from a planar state and molded into a cylindrical shape in which both end surfaces 2a and 2b hereof face each other. In the last step, both ends are pressed together by rolls 4 and come in contact with each other at a joint 6. In order to melt and join both end surfaces 2a and 2b which face each other, an induction coil 3 is provided at a position upstream from the rolls 4. By making high frequency currents flow through the induction coil 3, currents 5a and 5b flow through the metal strip ends 2a and 2b, the surfaces of the ends are heated and melted by joule heating, and the ends are welded at the joint 6. Here, the currents 5a and 5b which flow in the metal plate ends 2a and 2b are high frequency. Therefore, due to a skin effect, the currents flow in the surface of the metal strip 1 and tend to flow along the metal plate ends 2a and 2b due to a proximity effect (refer to Non-Patent Document 1).

If the length of the inner circumferential surface of the bent metal strip 1 is sufficiently longer compared to the distance between the induction coil 3 and the joint 6, since the impedance of the inner circumferential surface bent into a cylindrical shape is larger compared to the impedance of the induction coil 3 and the joint 6, the current tends to flow through the joint along the metal strip ends 2a and 2b as described above. However, in cases where the inner diameter of the cylindrical metal strip 1 is small and the impedance of the inner circumferential surface of the cylindrical body is not large, the currents toward the joint decreases, and the currents tend to flow around the inner circumferential surface of the pipe. In the related arts, in order to inhibit the current flow around the inner circumferential surface, as shown in the schematic cross-sectional view of FIG. 2, a method has been adopted in which a magnetic core referred to as an "impeder 7" is inserted into the inner space of the cylindrical metal strip 1, in order to increase the impedance of the inner circumferential surface, and thereby the currents around the inner circumferential surface of the metal strip 1 are inhibited.

Moreover, as described above, the current, which is inhibited from flowing through the inner periphery, flows through the end surfaces 2a and 2b of the metal strip 1. However, the inventors performed temperature measurements and electromagnetic field analysis, and as a result, as shown in FIG. 3, it was observed, in the flows of the currents, not only that some currents return toward the welding portion 6, but also that a fraction of the currents flows toward the upstream of the induction coil 3. The currents which flow toward the upstream of the induction coil generate sparks or the like at the rolls which are positioned in a portion upstream than the induction coil 3, and there are concerns that the surfaces of rolls may be damaged or the bearing and the like may be damaged.

The present invention is made in consideration of the above-described problems, and an object thereof is to provide an electric-resistance-welded pipe welding apparatus capable of effectively suppressing currents which flow upstream of an induction coil, by an apparatus having a simple configuration. The apparatus is capable of stably manufacturing the electric-resistance-welded pipe in an induction heating-type electric-resistance-welded pipe welding apparatus, in which induction currents are generated using the induction coil.

Solution to Problem

Aspects of the present invention are the following.
(1) In an electric-resistance-welded pipe welding apparatus according to an aspect of the present invention includes bending a traveling metal strip into a cylindrical shape by rolls, so that the ends in a width direction of a metal strip face each other. Thereafter, both ends are heated by currents which are induced by an induction coil provided in an immediate proximity to the metal strip which is bent into the cylindrical shape. Thereafter, the both ends are welded while both ends into are brought into press contact with each other. In addition, the electric-resistance-welded pipe welding apparatus includes: an impeder that is disposed inside of the metal strip which is bent into the cylindrical shape, the impeder being disposed spanning from a upstream position to a downstream position with respect to a position the induction coil is present, when viewed along a traveling direction of the metal strip; and a metallic shield plate that is disposed further upstream than an upstream end of the impeder and in a position which is further downstream than the rolls when viewed along the traveling direction, the metallic shield plate including a hole portion through which the metal strip bent into the cylindrical shape passes, and the metallic shield plate shielding a magnetic flux generated in the induction coil.

(2) The electric-resistance-welded pipe welding apparatus according to an aspect of the present invention further includes, in addition to the above-described (1), a ferromagnetic body that is disposed in a position corresponding to the upstream end of the impeder when viewed along the traveling direction of the metal strip, the position being peripheral of the metal strip bent into the cylindrical shape, and the position spanning the both ends.

Advantageous Effects of Invention

According to the electric-resistance-welded pipe welding apparatus according to the aspect of the invention, during the electric-resistance-welding of the pipe, in which the traveling metal strip is bent and shaped into a pipe and welded, damage to the rolls or the like due to the currents which flow toward upstream of the induction coil can be avoided. Accordingly, it is possible to stably operate the apparatus over an extended period without apparatus stoppage occurring due to exchange of the rolls or the like.

DESCRIPTION OF EMBODIMENTS

Hereinafter, embodiments of the present invention will be explained with reference to the drawings.

Figure 4:
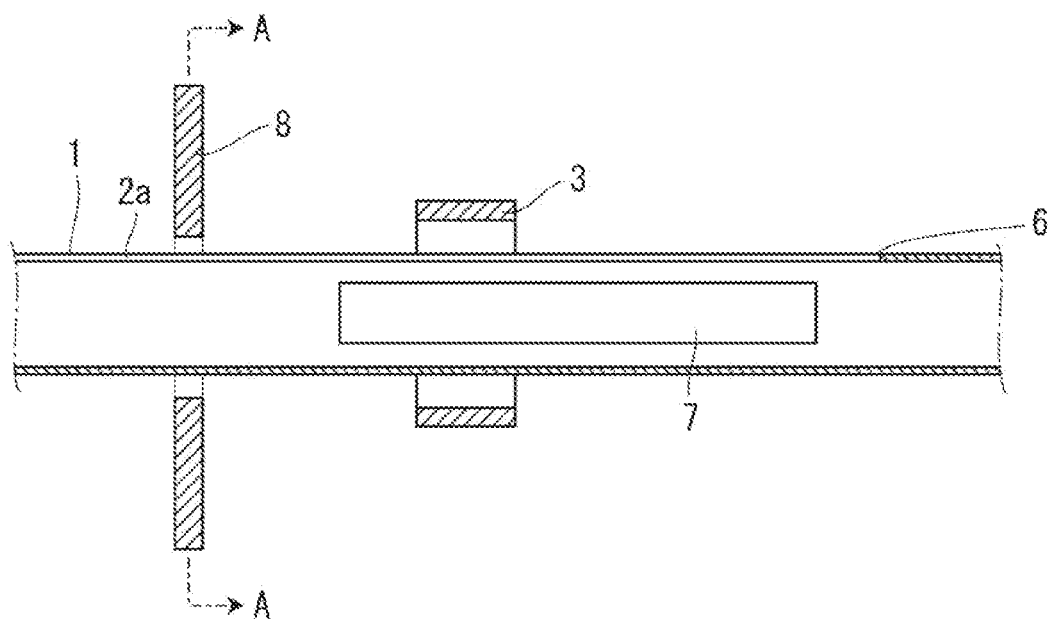
FIG. 4 is a schematic cross-sectional view of an apparatus for manufacturing an electric-resistance-welded pipe according to an embodiment of the present invention.
Figure 5:
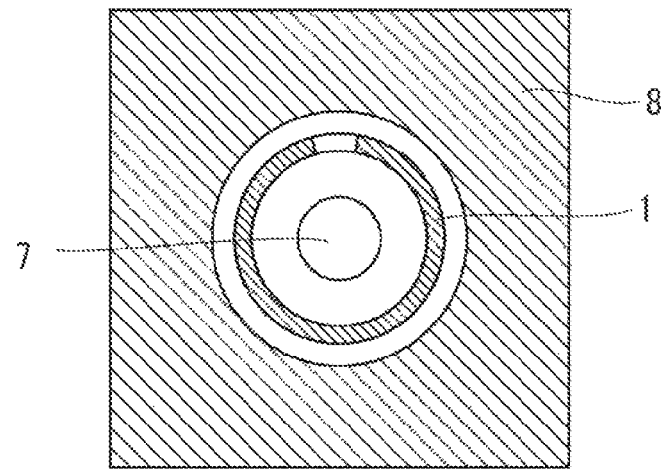
FIG. 5 is a schematic cross-sectional view taken along a line A-A of FIG. 4.

FIG. 4 is a schematic cross-sectional view showing an apparatus for manufacturing an electric-resistance-welded pipe of the present embodiment, and FIG. 5 is a schematic cross-sectional view taken along a line A-A of FIG. 4. In the apparatus for manufacturing the electric-resistance-welded pipe of the present embodiment, the pipe is manufactured by performing an electric resistance welding by an induction heating method using a induction coil to both ends of a metal strip molded into a cylindrical shape. In addition, the induction coil described in the explanation hereinafter collectively refers to induction coils, that is a pipe, wire material, plate or the like including a good conductor such as copper, which are wound around a material to be heated by at least one round.

In the present embodiment, in the upstream in the traveling direction of the induction coil 3 which is a power supply portion, a metallic shield plate 8, which includes a hole portion through which the metal strip 1 bent into a cylindrical shape may passes. The metallic shield plate 8 shields the magnetic flux generated by the induction coil. The metallic shield plate 8 is disposed so as to be substantially perpendicular to the traveling direction. The induction currents which tend to flow toward upstream in the traveling direction than the shield plate 8 can be suppressed by the shield plate 8.

More specifically, in the present embodiment, in the position corresponding to the inner portion of the metal strip 1 which is bent into a cylindrical shape, the impeder 7 is provided spanning from the upstream to the downstream in the traveling direction of the position in which the induction coil 3 is present, the induction coil 3 being a power supply portion. In addition, in a position which is upstream in the traveling direction than the induction coil 3, and is further upstream in the traveling direction than the upstream end of the impeder 7, and is further downstream in the traveling direction than the rolls 4, the metallic shield plate 8 is disposed. The metallic shield plate 8 includes a hole portion through which the metal strip bent into a cylindrical shape can pass. The metallic shield plate shields the magnetic flux generated by the induction coil 3.

Figure 3:
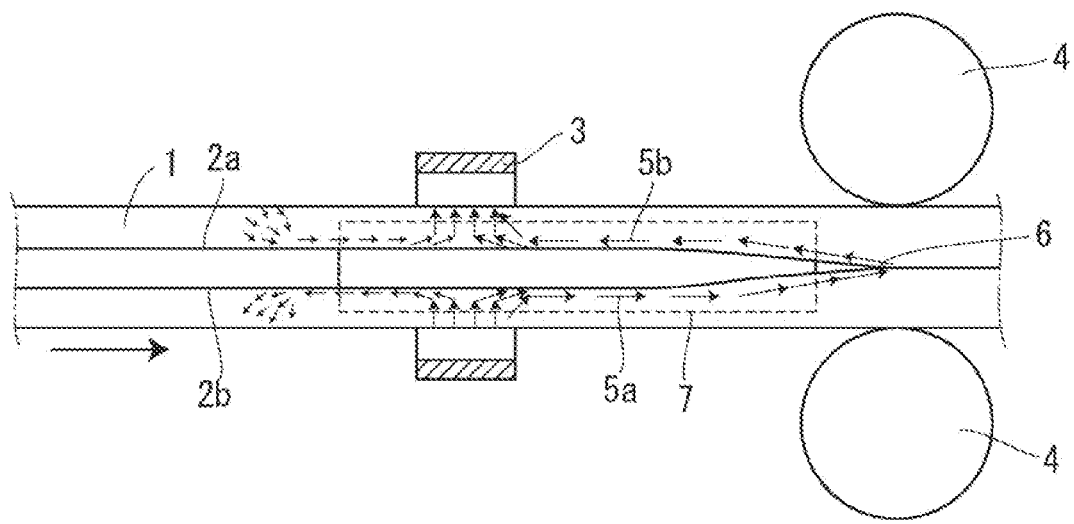
FIG. 3 is a schematic plan view showing a current distribution based on an electromagnetic field analysis.

In general, in order to prevent stray currents from flowing to a manufacturing line or the like, in most cases, a choke core or the like formed of a ferromagnetic body is used. The choke core is effective in order to cut the currents which flow to one direction. However, as shown in FIG. 3, in the production of electric-resistance-welded pipes, since high frequency currents simultaneously flow in each of the metal strip ends 2a and 2b in opposite directions, the choke core cannot be used. As shown in FIG. 3, in the production of the electric-resistance-welded pipes, the currents generated in the metal strip 1 by the induction coil 3 flow in two divided loops. One loop flows directly below the induction coil 3 and passes through a joint 6, and the other loop flows toward upstream of the induction coil 3. Since the currents which flow toward the upstream of the induction coil 3 is generated by the magnetic flux which is generated by the induction coil 3, if the magnetic flux is cut, the currents which flow toward the upstream of the induction coil 3 decreases.

Figure 6:
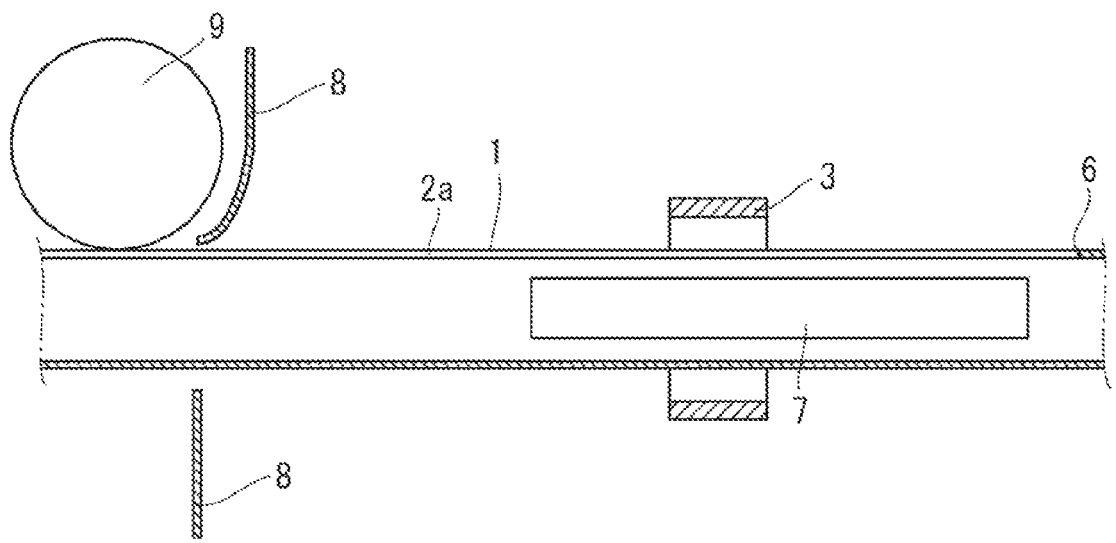
FIG. 6 is a schematic cross-sectional view of an example in which a shield plate is provided so as to surround a roll upstream of the induction coil, showing an apparatus for manufacturing an electric-resistance-welded pipe according to another embodiment of the present invention.

Therefore, in the present embodiment, the metallic shield plate 8 is disposed at a position upstream of the induction coil 3. Since the shield plate which uses metals having good conductivity has an effect of cutting the magnetic flux generated by the induction coil, the shield plate can cut the currents which flow toward upstream of the induction coil 3. As the material of the shield plate 8, low-resistance metals such as a copper plate or an aluminum plate may be used. The thickness of the shield plate is sufficient as long as it is several millimeters to several tens of millimeters, and the thickness is not particularly limited as long as it is capable of maintaining the shape of the shield plate. In addition, in the example shown in FIG. 5, the shape of the shield plate 8 is a rectangular shape. However, the shape may be annular or any other shape as long as it has a shape which is capable of cutting the unnecessary magnetic fluxes. The shield plate 8 includes a shape which has the hole portion through which the metal strip 1 bent into a cylindrical shape can passes. Accordingly, when the welding of the electric-resistance-welded pipe is performed by using the apparatus for manufacturing the electric-resistance-welded pipe of the present embodiment, the metal strip 1 bent into a cylindrical shape can be disposed so as to pass through the hole portion. Thereby, the magnetic flux of the upstream of the shield plate 8 is cut in the position upstream of the induction coil 3. Accordingly, the position upstream of the shield plate 8, it is possible to prevent currents from flowing through the metal strip bent into the cylindrical shape, as shown in FIG. 3, and it is also possible to cut the currents flowing through a roll 9 (refer to FIG. 6) disposed at a position upstream than the induction coil 3.

Moreover, as in the example shown in FIG. 4 or other figures, the size and the shape of the shield plate 8 are larger than those of the induction coil 3 and are set so as to cover the induction coil 3 in the welding direction in the plan view. This constitution is more preferable in that the magnetic flux toward the upstream in the welding direction can be effectively cut.

It is necessary to set the installation position of the shield plate 8 in the traveling direction of the metal strip at least downstream of the object to which current flow is not desired, such as the roll disposed at the upstream of the induction coil. However, if the shield plate 8 is too close to the induction coil 3, the shield plate 8 cut most of the magnetic flux which generated by the induction coil, which is not preferable for causing decrease of the welding efficiency. FIG. 4 shows an example in which the shield plate 8 is installed substantially perpendicular to the traveling direction. However, the present invention is not limited to this constitution, and any installation may be appropriately adopted, as long as it is capable of cutting the magnetic flux of the upstream of the shield plate 8. For example, as in the example shown in FIG. 6, it is more effective when the shield plate 8 is installed so as to surround the object to be protected (i.e., roll 9 in the example shown in FIG. 6) from the magnetic field of the induction coil 3.

The magnetic flux generated by the induction coil 3 forms a magnetic path which penetrates the surface of the metal strip 1 and flows around the periphery of the induction coil 3, except in the opening portion of the metal strip 1. In addition, since an eddy current passes through the metal strip ends 2a and 2b in the opening portion of the metal strip 1, there exists a magnetic flux passing through the ends of the metal strip 1, and a magnetic path in which the magnetic flux directly incurred from the opening portion enters the impeder 7. Since the impeder 7 uses a ferromagnetic body having high magnetic permeability, the magnetic flux tends to be concentrated in the portion in which the impeder 7 is present. Thereby, if the shield plate 8 is provided upstream of the induction coil 3 and above the impeder 7 (i.e., further to the downstream than the upstream end of the impeder 7), the shield plate 8 cuts the magnetic flux flowing in the vicinity of the upstream end of the impeder 7, causing a decrease of the magnetic flux passing through the impeder 7, resulting in a decrease in the welding efficiency. Therefore, in the present embodiment, it is preferable that the shield plate 8 be installed at least further upstream than the upstream end of the impeder 7.

Figure 7:
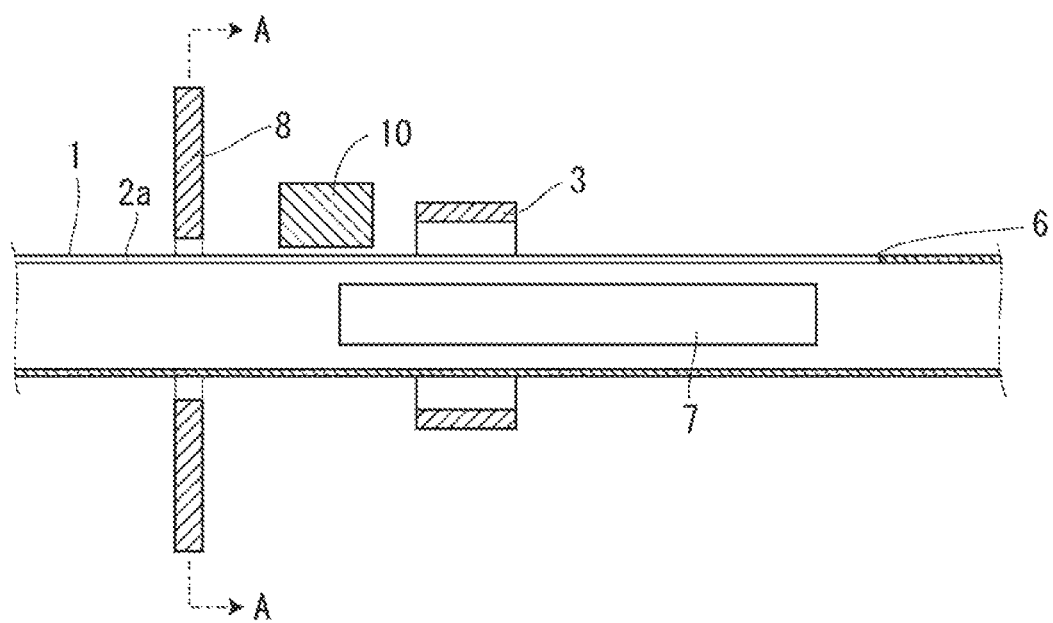
FIG. 7 is a schematic cross-sectional view of an example in which a ferromagnetic body is disposed on an impeder which is positioned upstream of the induction coil as a view showing an apparatus for manufacturing an electric-resistance-welded pipe according to still another embodiment of the present invention.

In addition, as described above, even when the shield plate 8 is installed further upstream than the upstream end of the impeder 7, the shield plate may partially decrease the magnetic flux generated by the induction coil 3. In order to prevent the decrease of the efficiency due to the decrease in the magnetic flux, in the present embodiment as shown in FIG. 7, it is more preferable to include a ferromagnetic body 10 which is disposed in the position corresponding to the upstream end of the impeder 7 (outside of the opening foamed between the opposing both ends of the metal strip) when viewed along the traveling direction of the metal strip 1. Moreover, it is further preferable that the ferromagnetic body 10 is disposed in the peripheral of the metal strip 1 bent into a cylindrical shape and in the position spanning over the both ends 2a and 2b.

Moreover, it is preferable that the ferromagnetic body 10 use materials such as a ferrite or an amorphous electric steel sheet which have a high relative magnetic permeability and a low magnetic resistance. In addition, by forcing the magnetic flux generated by the induction coil 3 to pass through the ferromagnetic body 10, the magnetic flux may be prevented from dispersed further to the upstream than the impeder 7. Therefore, this constitution has a function in which a magnetic path returning to the impeder 7 is securely provided. Accordingly, although a part of the magnetic flux which cannot penetrate the ferromagnetic body 10 reaches the shield plate 8, the magnetic flux thereof is reduced. The reduced magnetic flux can then be substantially cut by the shield plate 8. Therefore, it is possible to substantially cut the currents which flows toward the upstream. Moreover, by forcing the magnetic flux is generated by the induction coil 3 to pass in the ferromagnetic body 10, the welding efficiency can be kept with substantially no decrease even compared to the case where the shield plate 8 is not provided.

Since the ferromagnetic body 10 has the function which forces the magnetic flux generated by the induction coil 3 to return to the impeder 7, it is preferable that the installation position of the ferromagnetic body be the upstream of the induction coil 3 and above the impeder 7 (including a portion downstream than the upstream end of the impeder). In addition, since the ferromagnetic body easily generates heat due to a strong magnetic field if the ferromagnetic body 10 is too close to the induction coil 3, it is preferable to appropriately determine an installation position which tends not to generate heat. Moreover, like the example shown in FIG. 6, when the ferromagnetic body 10 is installed in the vicinity of the end of the impeder 7, it is more preferable to dispose the ferromagnetic body 10 at least above the end of the impeder 7. In addition, as for the width of the ferromagnetic body 10, it is preferable that the width is wider than that of the opening portion of the metal strip 1 (so that it spans across the opposing ends of the metal strip). The length of the ferromagnetic body may be appropriately determined according to the dimensions of the impeder 7. Moreover, the thickness of the ferromagnetic body 10 is not particularly defined. However, it is preferable that the position of the outer surface of the ferromagnetic body be set to be higher than the outer periphery position of the induction coil 3 (i.e., so that the distance from the cylinder axis of the metal strip is longer). Moreover, it is preferable that the distance between the ferromagnetic body 10 and the metal strip 1 be approximately several millimeters. However, considering the welding portion or the like, for example, the distance may be slightly larger, approximately several centimeters.

As described above, the electric-resistance-welded pipe manufacturing apparatus according to the present embodiment has advantageous effects such as the following. That is, the currents which flow to the upstream of the induction coil can be cut while the decrease of the heating efficiency is suppressed, the damage to the rolls which are disposed at the upstream of the induction coil can be prevented, and stable operation of the apparatus can be also realized.

EMBODIMENTS

Embodiment 1

In order to confirm the effects of the present invention, confirmation tests were performed. In the present tests, a parallel opening portion having a width of 15 mm was formed in a steel pipe for a gas pipe (SGP pipe) having the outer diameter of 39 mm and the thickness of 3 mm. Thereafter, the inclined portion of the opening portion between the welding portion and the joint 6 which is estimated was welded by a laser processing so as to be at an angle of 3°. In addition, through the disposition as shown in FIG. 4 (the position of the shield plate is changed), it was confirmed how the heating rate at the ends of the steel pipe which face each other changed according to whether or not the shield plate was present and the position of the shield plate.

Moreover, in the present tests, the shield plate was used in which the hole portion having the diameter of 50 mm is provided on the center of a square copper plate having each side of 150 mm and the thickness of 10 mm and the edge of the hole portion is separated by 6 mm from the steel pipe.

Figure 1:
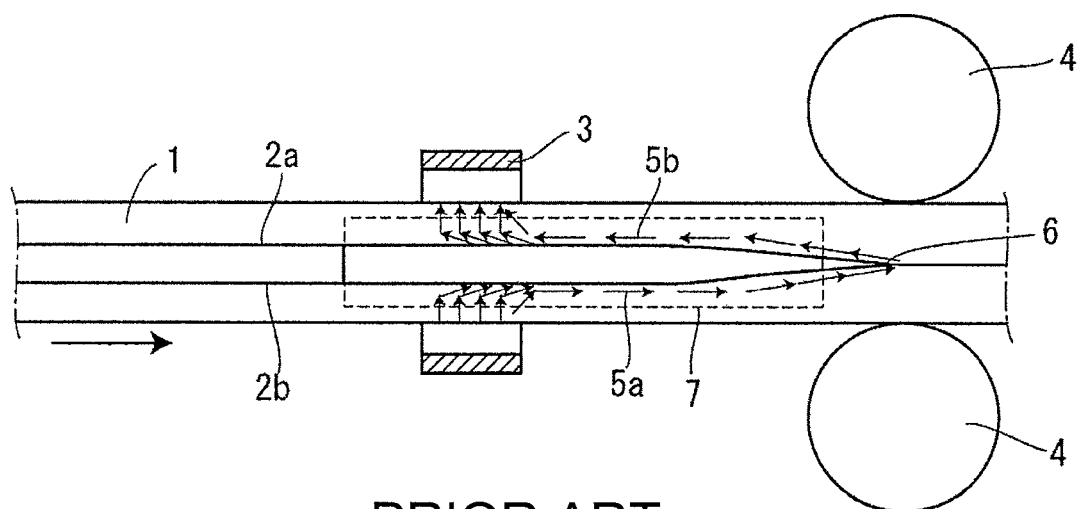
FIG. 1 is a schematic plan view showing a current distribution based on a concept of the related art using an induction coil.
Figure 2:
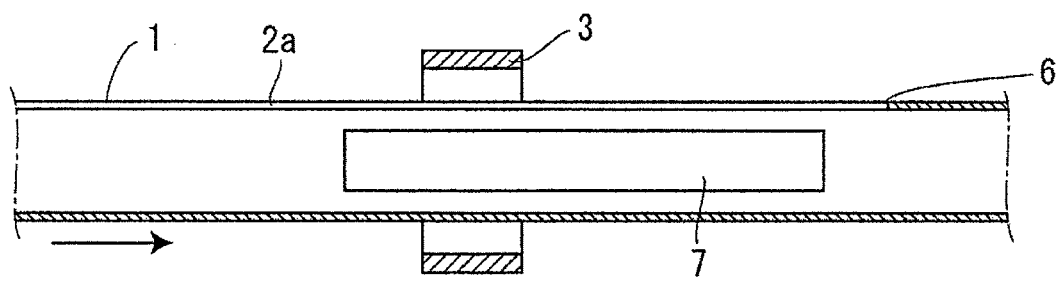
FIG. 2 is a schematic longitudinal cross-sectional view of the apparatus for manufacturing the electric-resistance-welded pipe shown in FIG. 1.

Initially, under the conditions of Inventive Example 1 in which the shield plate was installed at the position (the position which is 400 mm upstream from the welding portion and 200 mm upstream from the induction coil) which is 50 mm upstream from the impeder upstream end (the position which is 350 mm upstream from the welding portion and 150 mm upstream from the induction coil), the heating rate at the joint 6 (indicated by reference numeral 6 in FIG. 1, the portion at which the open metal strip ends meet) was measured, and a 50 µm K thermocouple was welded to the steel pipe ends in a position which is 420 mm upstream from the joint, and the temperature was measured and compared with the heating rate at the joint 6. In addition, under the conditions of Inventive Example 2 in which a ferrite core having the length of 60 mm, the width of 32 mm, and the thickness of 40 mm was installed at a position downstream from the impeder upstream end as the ferromagnetic body 10, in addition to a shield plate disposed at the same position as the Inventive Example 1, tests similar to the above were performed. Moreover, also in the condition of each example of Comparative Example 1 in which the shield plate was not provided and only a general induction coil was provided and Comparative Example 2 in which the shield plate was provided on the impeder (the position which is 40 mm downstream from the impeder upstream end and 100 mm upstream from the induction coil), tests similar to the above those were performed.

The induction coil in which a water-cooled copper pipe having a diameter of 10 mm was wound by two turns with a width of 50 mm was disposed so as to be separated by 150 mm from the joint with a gap of 5 mm from the steel pipe. In addition, power of 15 kW was input with a power source of 200 kHz in a resting state, and average heating rates from room temperature to 800° C. were was calculated. At this time, a core made of ferrite having a diameter of 16 mm and a length of 300 mm was used as the impeder, in which holes for water cooling of 6 mm are perforated in the center.

The results are shown in Table 1 below.

TABLE 1

| | | Heating at Point of 420 mm from the Welding Portion ° C. | Decrease Rate in Heating Rate % | Position of Shield Plate (Distance from Upstream End of Impeder) |
|---|---|---|---|---|
| The Present Invention | Inventive Example 1 | 0 | 13 | 50 mm Upstream |
| | Inventive Example 2 | 0 | 2 | 50 mm Upstream |
| Comparative Example | Comparative Example 1 | 65 | 0 | 50 mm Downstream |
| | Comparative Example 2 | 0 | 26 | 40 mm Downstream |

As is clear from Table 1, in the Comparative Example 1 before installing the shield plate, the temperature increased to 65° C. in the position 420 mm from the joint. However, in the Inventive Examples 1 and 2 in which the shield plate was installed, heating was not observed, and therefore, it was confirmed that currents do not flow further upstream than the shield plate.

On the other hand, in the Comparative Example 2 of the condition in which the installation position of the shield plate was above the impeder, the rate of decrease in the heating rate (=100−<heating rate in test subject>/<heating rate in Comparative Example 1>×100) was high, i.e., 26%. In contrast, in the Inventive Example 1 in which the installation position of the shield plate was separated by 50 mm from the impeder end, the decrease rate was about 13%, in which the decrease rate was improved into a half. Moreover, in the Inventive Example 2 in which the magnetic core was installed at the upstream of the induction coil, the decrease was about 2%.

As described above, in the electric-resistance-welded pipe welding apparatus according to the present invention, it is possible to reliably cut currents which flow to the metal strip of the upstream of the induction coil, and at the same time, the rolls or the like can be protected from damage due to the currents which flow to the upstream of the induction coil. In addition, it is also possible to suppress the decrease of the welding efficiency due to the shield plate to the minimum, and it was observed that the currents which flow to the upstream of the induction coil can be effectively cut.

INDUSTRIAL APPLICABILITY

According to the electric-resistance-welded pipe welding apparatus, the welding efficiency of the electric-resistance-welded pipe, which molds the metal strip into a cylindrical shape and welds it, while bending the traveling metal strip, can be effectively enhanced by simple apparatus configuration. Thereby, energy conservation can be realized by suppressing electric power consumption. In addition, because the line speed can be increased in the case where the same electric power is input, improvements in the productivity can be realized, and therefore the industrial effects thereof are significant.

REFERENCE SIGNS LIST

1: metal strip
2a and 2b: metal strip end
3: induction coil
4: roll
5a and 5b: current 6: joint
7: impeder
8: shield plate
9: roll
10: ferromagnetic body

The invention claimed is:

1. An electric-resistance-welded pipe welding apparatus, comprising:
   rolls bending a metal strip traveling in one direction into a cylindrical shape so that both ends in a width direction of the metal strip face each other;
   an induction coil provided in an immediate proximity to the metal strip bent into the cylindrical shape so that the both ends are heated, and are welded while being pressed to and coming in contact with each other;
   an impeder that is disposed inside of the metal strip bent into the cylindrical shape, the impeder being disposed spanning from an end of said induction coil to the other end of the induction coil in a traveling direction of the metal strip; and
   a metallic shield plate that is disposed further upstream than an upstream end of the impeder and is further downstream than the rolls in the traveling direction of the metal strip, the metallic shield plate located outside said impeder and including a hole portion through which the whole metal strip bent into the cylindrical shape passes, the metallic shield plate shielding a magnetic flux generated in the induction coil, and a ferromagnetic body that is disposed between said metallic shield plate and said induction coil in a position corresponding to the upstream end of the impeder when viewed along the traveling direction of the metal strip, the position being peripheral of the metal strip bent into the cylindrical shape, and the position spanning the both ends of the metal strip,
   wherein:
   the metallic shield plate is disposed at a predetermined distance apart from the upstream end of the impeder, and
   the metallic shield plate is disposed to surround an outer surface of the metal strip bent into the cylindrical shape.

2. The electric-resistance-welded pipe welding apparatus according to claim 1, wherein
   the induction coil is covered with the metallic shield plate when viewed from the traveling direction of the metal strip.

3. The electric-resistance-welded pipe welding apparatus according to claim 1, wherein
   a diameter of the hole portion is larger than an outer diameter of the metal strip bent into the cylindrical shape.

4. The electric-resistance-welded pipe welding apparatus according to claim 1, wherein
   the metallic shield plate has a rectangular shape.

* * * * *